(12) United States Patent
Miyamoto

(10) Patent No.: US 10,317,833 B2
(45) Date of Patent: Jun. 11, 2019

(54) IMAGE FORMING APPARATUS, IMAGE FORMING METHOD CAPABLE OF NOTIFYING RELATED PRINT JOB

(71) Applicant: KYOCERA Document Solutions Inc., Osaka-shi, Osaka (JP)

(72) Inventor: Takanori Miyamoto, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/764,253

(22) PCT Filed: Sep. 27, 2016

(86) PCT No.: PCT/JP2016/078413
§ 371 (c)(1),
(2) Date: Mar. 28, 2018

(87) PCT Pub. No.: WO2017/057343
PCT Pub. Date: Apr. 6, 2017

(65) Prior Publication Data
US 2018/0284678 A1    Oct. 4, 2018

(30) Foreign Application Priority Data

Sep. 30, 2015 (JP) .................................. 2015-194323

(51) Int. Cl.
*G03G 15/00* (2006.01)
*G06F 3/00* (2006.01)
(Continued)

(52) U.S. Cl.
CPC .......... *G03G 15/5091* (2013.01); *B41J 29/00* (2013.01); *B41J 29/38* (2013.01);
(Continued)

(58) Field of Classification Search
CPC ........... G03G 15/5091; G03G 15/5083; G03G 2215/00113; G03G 2215/00126;
(Continued)

(56) References Cited

U.S. PATENT DOCUMENTS 6,944,428 B2 * 9/2005 Hagiwara ........... H04W 52/283
                                                    342/357.52
7,187,462 B2 * 3/2007 Oakeson ................ G06F 3/1212
                                                    358/1.14
(Continued)

FOREIGN PATENT DOCUMENTS

JP    2000022882 A    1/2000
JP     200351909 A    2/2003
(Continued)

OTHER PUBLICATIONS

Japanese Patent Office, Office Action Issued in Application No. 2017543422, Mar. 12, 2019, 5 pages.

*Primary Examiner* — Robert B Beatty
(74) *Attorney, Agent, or Firm* — Alleman Hall Creasman & Tuttle LLP

(57) ABSTRACT

An image forming apparatus includes: a print processing portion that executes print jobs transmitted from a plurality of information processing apparatuses, according to a predetermined execution order; a human detecting portion that detects a presence of a human within a predetermined specific range from the image forming apparatus; a job identifying portion that identifies, from the print jobs, a first print job that corresponds to the human detected by the human detecting portion; a job detecting portion that detects, from the print jobs, a presence of a second print job that was transmitted from any of one or more second information processing apparatuses that have been grouped into the same group as a first information processing apparatus that is a transmission source of the first print job identified by the job
(Continued)

identifying portion; and a notification processing portion that notifies the presence of the detected second print job.

8 Claims, 5 Drawing Sheets

(51) Int. Cl.
*G06F 3/12* (2006.01)
*B41J 29/00* (2006.01)
*B41J 29/38* (2006.01)
*B41J 29/42* (2006.01)
*H04N 1/00* (2006.01)

(52) U.S. Cl.
CPC .......... *B41J 29/42* (2013.01); *G03G 15/5066* (2013.01); *G03G 15/5083* (2013.01); *G06F 3/1222* (2013.01); *G06F 3/1238* (2013.01); *G06F 3/1263* (2013.01); *G06F 3/1284* (2013.01); *G06F 3/1296* (2013.01); *H04N 1/00* (2013.01); *G03G 2215/00113* (2013.01); *G03G 2215/00126* (2013.01)

(58) Field of Classification Search
CPC ........ G06F 3/011; G06F 3/1238; G06F 3/126; G06F 3/1262; G06F 3/1263; G06F 3/1296

USPC .................................................... 399/79, 80
See application file for complete search history.

(56) References Cited

U.S. PATENT DOCUMENTS

| | | | |
|---|---|---|---|
| 7,791,747 B2* | 9/2010 | Roksz | G06F 21/608 358/1.14 |
| 2003/0027528 A1 | 2/2003 | Hagiwara et al. | |
| 2005/0287992 A1 | 12/2005 | Hagiwara et al. | |
| 2009/0021783 A1* | 1/2009 | Hosokawa | H04N 1/00222 358/1.15 |
| 2015/0199161 A1* | 7/2015 | Gutnik | G06F 3/1296 358/1.15 |
| 2017/0068495 A1* | 3/2017 | Kobayashi | G06F 3/1263 |

FOREIGN PATENT DOCUMENTS

| | | | | |
|---|---|---|---|---|
| JP | 2004096793 A | * | 3/2004 | |
| JP | 2005205741 A | * | 8/2005 | |
| JP | 2007098590 A | * | 4/2007 | |
| JP | 2008186193 A | * | 8/2008 | |
| JP | 2009066929 A | * | 4/2009 | |
| JP | 2009234106 A | * | 10/2009 | |
| JP | 2010214912 A | | 9/2010 | |
| JP | 2011198089 A | * | 10/2011 | |
| JP | 2014111353 A | * | 6/2014 | |

* cited by examiner

IMAGE FORMING APPARATUS, IMAGE FORMING METHOD CAPABLE OF NOTIFYING RELATED PRINT JOB

TECHNICAL FIELD

The present invention relates to an image forming apparatus and an image forming method.

BACKGROUND ART

There is known an image forming apparatus (for example, see PTL 1) such as a printer capable of receiving and executing a print job transmitted from an information processing apparatus such as a personal computer. For example, this type of image forming apparatus is connected to a plurality of information processing apparatuses, and executes, in a received order, print jobs transmitted from the plurality of information processing apparatuses.

CITATION LIST

Patent Literature

[PTL 1] Japanese Patent Application Publication No. 2010-214912

SUMMARY OF THE INVENTION

Problems to be Solved by the Invention

Meanwhile, users of the information processing apparatuses need to go to the installation position of the image forming apparatus individually so as to collect prints corresponding to their print jobs.

The present invention has been made in view of such conventional circumstances, and it is an object of the present invention to provide an image forming apparatus and an image forming method that can reduce labor and time of the users who collect prints.

Solution to the Problems

An image forming apparatus according to an aspect of the present invention includes a print processing portion, a human detecting portion, a job identifying portion, a job detecting portion, and a notification processing portion. The print processing portion executes print jobs transmitted from a plurality of information processing apparatuses, according to a predetermined execution order. The human detecting portion detects a presence or an absence of a human within a predetermined specific range from the image forming apparatus. The job identifying portion, in a case where a presence of a human has been detected by the human detecting portion, identifies, from the print jobs, a first print job that corresponds to the human detected by the human detecting portion. The job detecting portion detects, from the print jobs, a presence or an absence of a second print job that was transmitted from any of one or more second information processing apparatuses that have been grouped into the same group as a first information processing apparatus that is a transmission source of the first print job identified by the job identifying portion. The notification processing portion notifies the presence of the second print job in a case where the second print job has been detected by the job detecting portion.

An image forming method according to another aspect of the present invention includes a first step, a second step, a third step, a fourth step, and a fifth step. In the first step, print jobs transmitted from a plurality of information processing apparatuses are executed according to a predetermined execution order. In the second step, a presence or an absence of a human within a predetermined specific range from an image forming apparatus is detected. In the third step, in a case where a presence of a human has been detected in the second step, a first print job that corresponds to the human detected in the second step is identified from the print jobs. In the fourth step, a presence or an absence of a second print job that was transmitted from any of one or more second information processing apparatuses that have been grouped into the same group as a first information processing apparatus that is a transmission source of the first print job identified in the third step, is detected from the print jobs. In the fifth step, in a case where the second print job has been detected in the fourth step, the presence of the second print job is notified.

Advantageous Effects of the Invention

According to the present invention, an image forming apparatus and an image forming method that can reduce labor and time of the users who collect prints are realized.

DESCRIPTION OF EMBODIMENTS

The following describes an embodiment of the present invention with reference to the accompanying drawings for the understanding of the invention. It should be noted that the following embodiment is an example of a specific embodiment of the present invention and should not limit the technical scope of the present invention.

[Communication System 100]

Figure 1:
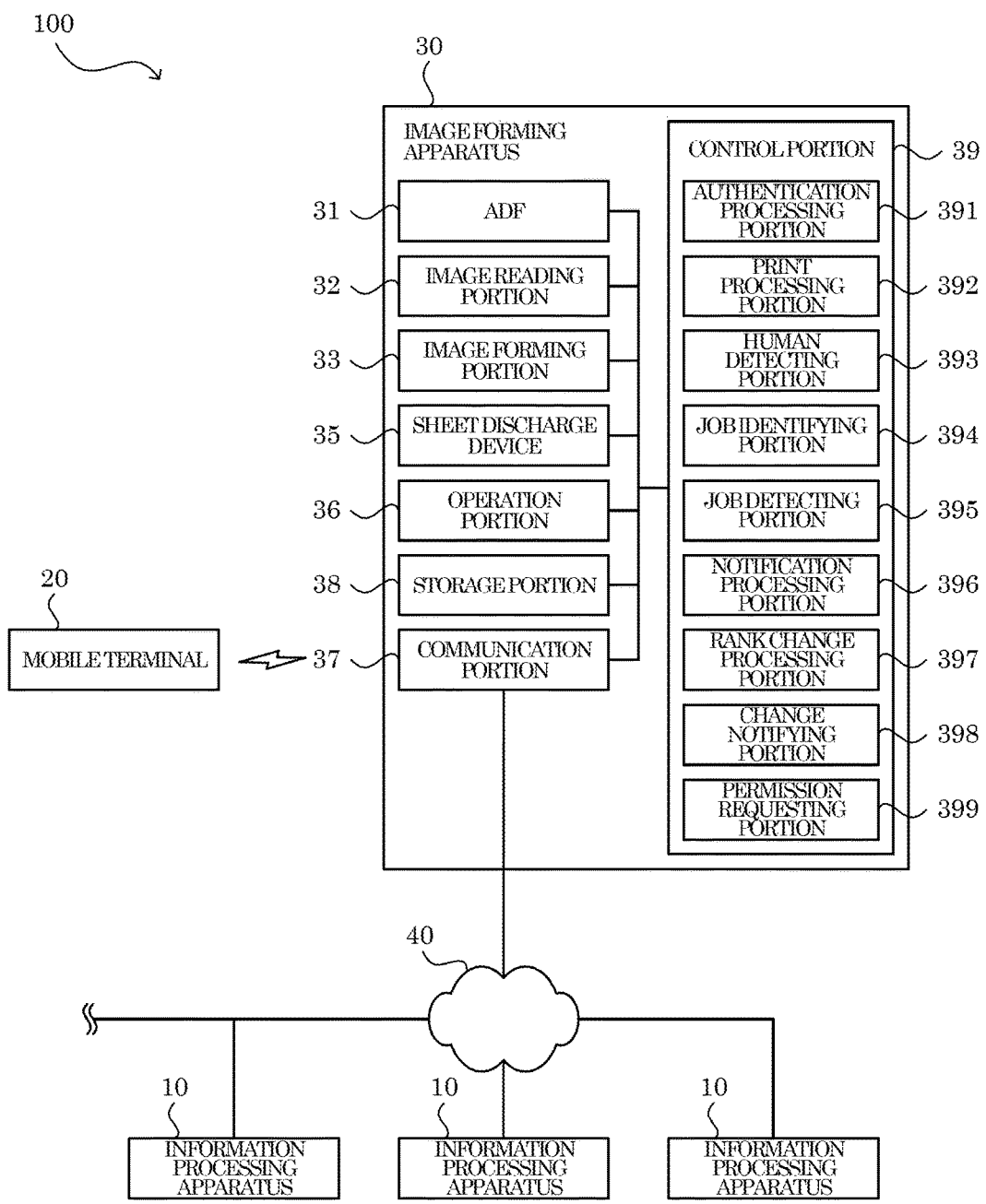
FIG. 1 is a block diagram showing a configuration of a communication system including an image forming apparatus according to an embodiment of the present invention.

As shown in FIG. 1, a communication system 100 which includes an image forming apparatus 30 according to the embodiment of the present invention, includes a plurality of information processing apparatuses 10, a mobile terminal 20, and the image forming apparatus 30. In the communication system 100, the plurality of information processing apparatuses 10 and the image forming apparatus 30 are connected to each other via a communication network 40 in such a way as to communicate with each other.

The information processing apparatuses 10 are each a communication apparatus such as a personal computer that can cause the image forming apparatus 30 to execute a print job to print image data.

The mobile terminal 20 is a mobile communication terminal such as a smartphone carried by the user of the image forming apparatus 30. It is noted that the mobile terminal 20 may be a mobile telephone, a tablet terminal, a notebook computer, a PDA or the like.

The mobile terminal 20 is configured to execute a wireless data communication with the image forming apparatus 30. For example, the mobile terminal 20 executes a wireless data communication with the image forming apparatus 30 in accordance with communication protocols defined by Bluetooth™. For example, the mobile terminal 20 executes a wireless data communication by Bluetooth by a radio wave intensity (2.5 mW) of Class 2, with the image forming apparatus 30 that is located within a range of approximately 10 meters from the mobile terminal 20. It is noted that the mobile terminal 20 may execute a wireless communication with the image forming apparatus 30 in accordance with a communication standard of a wireless LAN.

Here, the mobile terminal 20 performs a pairing with the image forming apparatus 30 in advance, wherein the pairing is an authentication procedure for authenticating the communication partner of a Bluetooth communication. In the pairing, pairing IDs required for authenticating the communication partners are exchanged between the apparatuses that execute the Bluetooth communication. The pairing ID of the image forming apparatus 30 acquired by the mobile terminal 20 by the pairing is stored in a storage portion of the mobile terminal 20. This enables a Bluetooth wireless communication to be executed between the mobile terminal 20 and the image forming apparatus 30.

[Outlined Configuration of Image Forming Apparatus 30]

Next, an outlined configuration of the image forming apparatus 30 according to the embodiment of the present invention is described with reference to FIG. 1 and FIG. 2. Here, FIG. 2 is a front view of the image forming apparatus 30.

Figure 2:
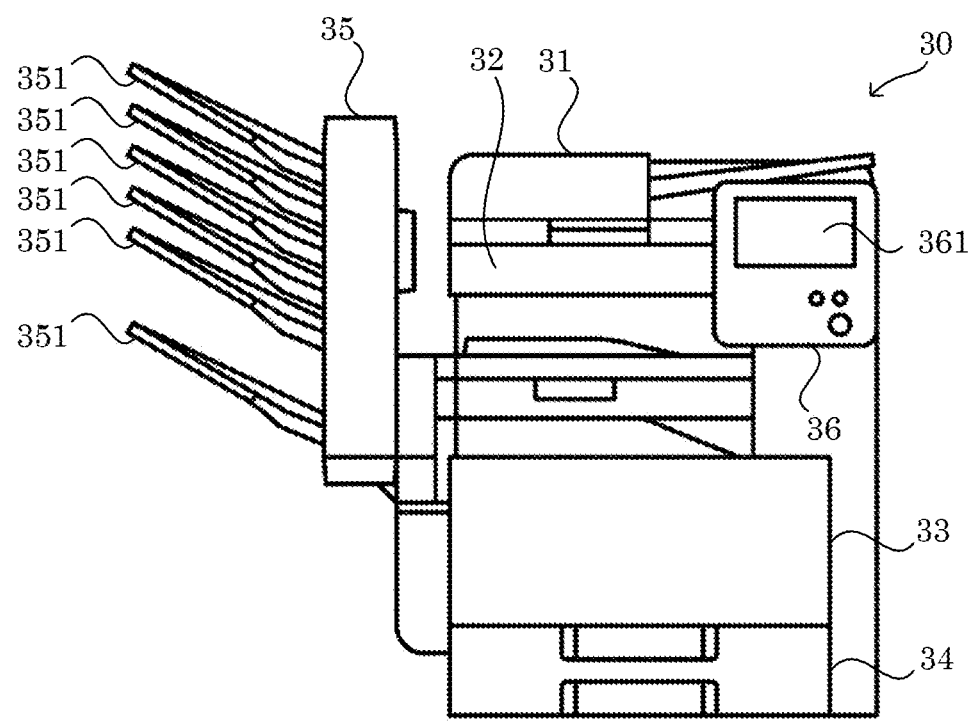
FIG. 2 is a diagram showing the image forming apparatus according to the embodiment of the present invention.

As shown in FIG. 1 and FIG. 2, the image forming apparatus 30 includes an ADF 31, an image reading portion 32, an image forming portion 33, a sheet feed cassette 34, a sheet discharge device 35, an operation portion 36, a communication portion 37, a storage portion 38, and a control portion 39. The image forming apparatus 30 is a multifunction peripheral having a plurality of functions such as a scan function for reading image data from a document sheet, a print function for forming an image based on image data, a facsimile function, and a copy function. It is noted that the present invention is applicable to image forming apparatuses such as a printer apparatus, a facsimile apparatus, and a copier.

The ADF 31 is an automatic document feeding device that includes a document sheet setting portion, a conveyance roller, a document sheet pressing, and a sheet discharge portion, and conveys a document sheet so that it is read by the image reading portion 32. The image reading portion 32 includes a document sheet table, a light source, a mirror, an optical lens, and a CCD (Charge Coupled Device), and is configured to read image data from a document sheet.

The image forming portion 33 is configured to form an image by an electrophotographic system based on image data read by the image reading portion 32, or image data input from the information processing apparatus 10 or the like. Specifically, the image forming portion 33 includes a photoconductor drum, a charging device, a laser scanning unit (LSU), a developing device, a transfer roller, a cleaning device, and a fixing roller.

The sheet discharge device 35 includes a plurality of sheet discharge trays 351 aligned in the vertical direction. The sheet discharge device 35 is configured to discharge a sheet with an image formed thereon by the image forming portion 33 to a preset sheet discharge tray 351 out of the plurality of sheet discharge trays 351. For example, a usable sheet discharge tray 351 may be set in advance for each user of the image forming apparatus 30 or for each department of the users.

The operation portion 36 includes a touch panel 361 configured to display various types of information such as operation screens, and receive user operations. It is noted that the operation portion 36 is provided with hard keys such as a start key, as well as the touch panel 361. In addition, the operation portion 36 is pivotably supported by an exterior member of the image forming apparatus 30. For example, the operation portion 36 is pivotable between a first attitude (see FIG. 1) and a second attitude, wherein at the first attitude, a surface of the operation portion 36 (a surface of the touch panel 361) becomes parallel to the vertical direction, and at the second attitude, the touch panel 361 becomes parallel to a horizontal plane.

The communication portion 37 is configured to execute data communications with the information processing apparatuses 10 connected to the communication network 40, via the communication network 40 connected by wire to the image forming apparatus 30.

In addition, the communication portion 37 is configured to execute a wireless data communication with the mobile terminal 20. For example, the communication portion 37 executes a wireless data communication with the mobile terminal 20 in accordance with a predetermined communication protocol defined by Bluetooth. For example, the communication portion 37 is configured to, as in the mobile terminal 20, execute a wireless data communication by Bluetooth by a radio wave intensity of Class 2, with the mobile terminal 20 that is located within a range of approximately 10 meters from the image forming apparatus 30. Here, the image forming apparatus 30 performs a pairing with the mobile terminal 20 in advance, and the pairing ID of the mobile terminal 20 is stored in the storage portion 38. It is noted that the communication portion 37 may execute a wireless communication with the mobile terminal 20 in accordance with a communication standard of a wireless LAN.

The storage portion 38 is a SSD (Solid State Drive), a HDD (Hard Disk Drive) or the like. The storage portion 38 stores authentication information used in the authentication of the user, the authentication information includes a user name and a password. In addition, the storage portion 38 stores terminal identification information. For example, the terminal identification information is the pairing ID. In addition, in a case where a wireless communication is executed between the image forming apparatus 30 and the mobile terminal 20 in accordance with a communication standard of a wireless LAN, the terminal identification information may be a MAC address of the mobile terminal 20.

Furthermore, the storage portion 38 stores identification information of each of the plurality of information processing apparatuses 10. For example, the identification information is a MAC address or an IP address of the information processing apparatus 10. In addition, the identification information may be a name of the information processing apparatus 10 set by the user.

Here, in the communication system 100, the plurality of information processing apparatuses 10 are grouped into a plurality of groups that are set in advance. For example, the group may be set for each set of information processing apparatuses 10 that are installed close to each other. In addition, the group may be set for each department to which users of the information processing apparatuses 10 belong. Specifically, in the image forming apparatus 30, a plurality of pieces of identification information of the information processing apparatuses 10 are each stored in the storage portion 38 in association with any of the plurality of groups.

In addition, in the image forming apparatus 30, the terminal identification information of the mobile terminal 20 and the identification information of the information processing apparatuses 10 are stored in the storage portion 38 in association with each other. Furthermore, in the image forming apparatus 30, the authentication information and the identification information of the information processing apparatuses 10 are stored in the storage portion 38 in association with each other.

The control portion 39 includes control equipment such as CPU, ROM, RAM, and EEPROM™ that are not shown. The CPU is a processor that executes various calculation processes. The ROM is a nonvolatile storage portion in which various information such as control programs for causing the CPU to execute various processes are stored in advance. The RAM is a volatile storage portion, and the EEPROM is a nonvolatile storage portion. The RAM and the EEPROM are used as temporary storage memory (working area) for the various processes executed by the CPU. In the control portion 39, the CPU executes the various control programs stored in advance in the ROM. This allows the image forming apparatus 30 to be controlled comprehensively by the control portion 39. It is noted that the control portion 39 may be formed as an electronic circuit such as an integrated circuit (ASIC), and may be a control portion provided independently of a main control portion that comprehensively controls the image forming apparatus 30.

In addition, as shown in FIG. 1, the control portion 39 includes an authentication processing portion 391 and a print processing portion 392. Specifically, the control portion 39 executes the control program stored in the ROM by using the CPU. This allows the control portion 39 to function as the authentication processing portion 391 and the print processing portion 392.

The authentication processing portion 391 executes a log-in process in which to authenticate the user based on a predetermined authentication operation. Specifically, the authentication processing portion 391 displays an authentication screen on the operation portion 36 such that the authentication operation can be performed thereon. The authentication processing portion 391 then receives log-in information input by the user on the authentication screen to the operation portion 36. The log-in information includes a user name and a password.

Subsequently, in a case where the log-in information input via the operation portion 36 is included in the authentication information stored in the storage portion 38, the authentication processing portion 391 determines that the authentication is completed, and allows the user to log in to the image forming apparatus 30. It is noted that the authentication processing portion 391 executes a log-out process to log out the currently logged in user in a case where a log-out operation has been performed on the operation portion 36, in a case where a predetermined time period has elapsed, or in a case where another user is to be logged in.

The print processing portion 392 executes print jobs transmitted from the plurality of information processing apparatuses 10, according to a predetermined execution order. For example, in the image forming apparatus 30, the print jobs transmitted from the plurality of information processing apparatuses 10 are stored in the storage portion 38 in the order that they are received by the communication portion 37. The print processing portion 392 then reads the print jobs from the storage portion 38 in the order that they were stored therein, and executes the print jobs in sequence. It is noted that the print processing portion 392 deletes print jobs from the storage portion 38 after they are executed. In addition, in a case where priorities have been set to the print jobs transmitted from the information processing apparatuses 10, the print processing portion 392 may determine the execution order of the print jobs based on the priorities set to the print jobs.

In addition, in a case where a print job transmitted from an information processing apparatus 10 is a confidential print job, the print processing portion 392 suspends the execution of the confidential print job until an execution condition including an input of predetermined job authentication information is satisfied. For example, the job authentication information is a code number or a password set in the confidential print job. In addition, the job authentication information may be the authentication information. That is, the print processing portion 392 may execute the confidential print job when a user who can log in by authentication information that corresponds to the identification information of an information processing apparatus 10 that is the transmission source of the confidential print job, has logged in to the image forming apparatus 30.

Meanwhile, the users of the information processing apparatuses 10 need to go to the installation position of the image forming apparatus 30 individually so as to collect prints corresponding to their print jobs. On the other hand, the image forming apparatus 30 according to the embodiment of the present invention can reduce labor and time of the users who collect the prints.

Figure 3:
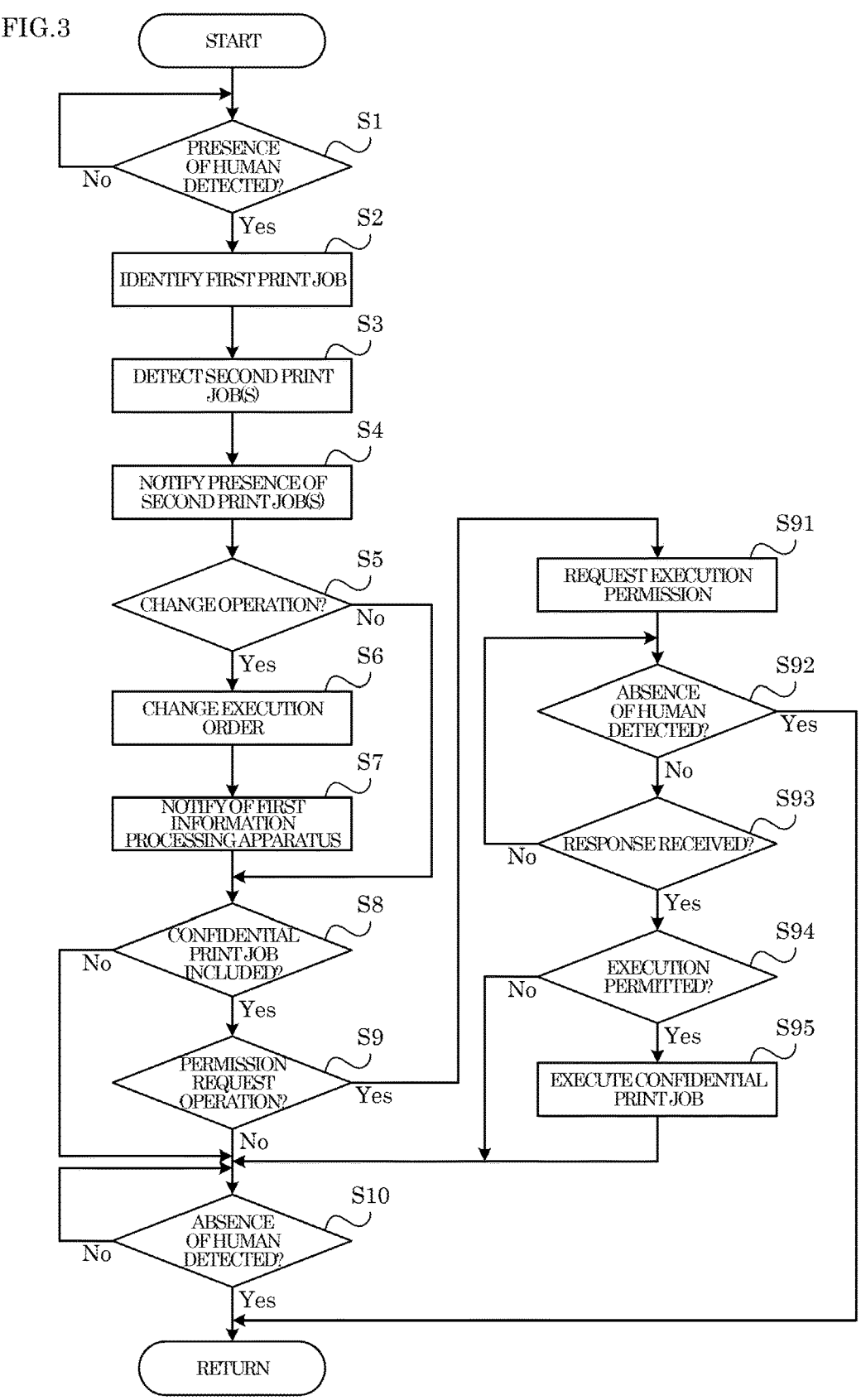
FIG. 3 is a flowchart showing an example of a notification process executed in the image forming apparatus according to the embodiment of the present invention.

Specifically, a notification program for causing the CPU of the control portion 39 to execute a notification process (see the flowchart of FIG. 3) is stored in advance in the ROM of the control portion 39. It is noted that the notification program may be recorded on a computer-readable recording medium such as a CD, a DVD, or a flash memory, and may be installed from the recording medium to the storage portion 38 or the like.

As shown in FIG. 1, the control portion 39 further includes a human detecting portion 393, a job identifying portion 394, a job detecting portion 395, a notification processing portion 396, a rank change processing portion 397, a change notifying portion 398, and a permission requesting portion 399. Specifically, the control portion 39 executes the notification program stored in the ROM by using the CPU. This allows the control portion 39 to function as the human detecting portion 393, the job identifying portion 394, the job detecting portion 395, the notification processing portion 396, the rank change processing portion 397, the change notifying portion 398, and the permission requesting portion 399.

The human detecting portion 393 detects a presence or an absence of a human within a predetermined specific range from the image forming apparatus 30. For example, in a case where a mobile terminal 20 whose terminal identification information has been stored in advance in the image forming apparatus 30 is detected within the specific range, the human detecting portion 393 determines that a human is present within the specific range.

For example, the human detecting portion 393 controls the communication portion 37 to transmit a control signal conforming to a Bluetooth communication system to the periphery of the image forming apparatus 30 so as to detect whether or not an apparatus that can perform the Bluetooth communication is present within the Bluetooth communication range. Subsequently, if a pairing ID acquired from a detected apparatus matches the pairing ID of the mobile terminal 20 that is stored as the terminal identification information in the storage portion 38, the human detecting portion 393 determines that a presence of a mobile terminal 20 whose terminal identification information had been stored in advance in the image forming apparatus 30, was detected within the specific range. Here, a communication range of the Bluetooth communication executed by the communication portion 37 is an example of the predetermined specific range of the present invention.

In addition, the human detecting portion 393 may control the communication portion 37 to transmit a control signal conforming to a wireless LAN communication system to the periphery of the image forming apparatus 30 so as to detect whether or not an apparatus that can perform a wireless LAN communication is present within a wireless LAN communication range. In that case, if a MAC address acquired from a detected apparatus matches the MAC address of the mobile terminal 20 that is stored as the terminal identification information in the storage portion 38, the human detecting portion 393 determines that a presence of a mobile terminal 20 whose terminal identification information had been stored in advance in the image forming apparatus 30, was detected within the specific range. Here, a communication range of the wireless LAN communication executed by the communication portion 37 is another example of the predetermined specific range of the present invention.

It is noted that as another embodiment, the human detecting portion 393 may use a human sensor to detect a presence or an absence of a human within the specific range. In that case, a human detection range of the human sensor is another example of the predetermined specific range of the present invention.

The job identifying portion 394 is configured to, in a case where a presence of a human has been detected by the human detecting portion 393, identifies, from the print jobs stored in the storage portion 38, a first print job that corresponds to the human detected by the human detecting portion 393. For example, the job identifying portion 394 identifies, as the first print job, a print job that was transmitted from an information processing apparatus 10 that had been set in advance in correspondence with the mobile terminal 20 detected by the human detecting portion 393.

For example, the job identifying portion 394 reads, from the storage portion 38, identification information of an information processing apparatus 10 that corresponds to the terminal identification information of the mobile terminal 20 detected by the human detecting portion 393. The job identifying portion 394 then identifies, as the first print job, a print job that was transmitted from an information processing apparatus 10 whose identification information matches the read identification information, from the print jobs stored in the storage portion 38.

It is noted that in the case of the above-mentioned another embodiment in which the human detecting portion 393 uses a human sensor to detect a presence or an absence of a human within the specific range, the job identifying portion 394 may identify, as the first print job, a print job that is being executed by the print processing portion 392.

It is noted that in the case of the above-mentioned another embodiment, the job identifying portion 394 may include an information acquiring portion configured to acquire user information, and may identify, as the first print job, a print job that was transmitted from an information processing apparatus 10 that had been set in advance in correspondence with the user information acquired by the information acquiring portion.

For example, in the image forming apparatus 30 according to the above-mentioned another embodiment, the first print job may be identified based on authentication information of a user who logs in the image forming apparatus 30, the authentication information being acquired by the authentication processing portion 391. Here, the authentication processing portion 391 is an example of the information acquiring portion of the present invention. In addition, the authentication information is an example of the user information of the present invention.

The job detecting portion 395 detects, from the print jobs stored in the storage portion 38, a presence or an absence of a second print job that was transmitted from any of one or more second information processing apparatuses that have been grouped into the same group as a first information processing apparatus that is a transmission source of the first print job identified by the job identifying portion 394.

For example, the job detecting portion 395 reads, from the storage portion 38, identification information of an information processing apparatus 10 that has been grouped into the same group as the first information processing apparatus that is the transmission source of the first print job identified by the job identifying portion 394. The job detecting portion 395 then identifies, as the second print job, a print job that was transmitted from an information processing apparatus 10 whose identification information matches the read identification information, from the print jobs stored in the storage portion 38.

On the other hand, in a case where the second print job has been detected by the job detecting portion 395, the print processing portion 392 outputs a print that is output as a result of execution of the second print job, in such a manner as to be distinguishable from prints output as a result of executions of the other print jobs. For example, the print processing portion 392 discharges a print that is output as a result of execution of the second print job, to a sheet discharge tray 351 that is different from sheet discharge trays 351 to which prints output as a result of executions of the other print jobs are discharged.

It is noted that the print processing portion 392 may discharge the print that is output as a result of execution of the second print job, to the sheet discharge tray 351 such that the print that is discharged to the sheet discharge tray 351 as a result of execution of the second print job, is shifted, in placement position on the sheet discharge tray 351, from the prints that are discharged to the sheet discharge tray 351 as a result of executions of the other print jobs. In addition, the print processing portion 392 may insert a sheet of paper between the print output as a result of execution of the second print job and the prints output as a result of executions of the other print jobs. Furthermore, the print processing portion 392 may display, on the operation portion 36, an indication that a currently executed print job is the second print job while the second print job is being executed.

The notification processing portion 396 notifies a presence of the second print job in a case where the second print job has been detected by the job detecting portion 395. In addition, the notification processing portion 396 notifies the rank of the second print job in the execution order and identification information of a second information processing apparatus that is a transmission source of the second print job, as well as the presence of the second print job.

It is noted that the notification processing portion 396 may notify the rank of the second print job in the execution order and the identification information of the second information processing apparatus that is the transmission source of the second print job, to the mobile terminal 20 detected by the human detecting portion 393. In addition, the notification processing portion 396 may notify only the presence of the second print job. In addition, the notification processing portion 396 may notify the rank of the second print job in the execution order or the identification information of the second information processing apparatus that is the transmission source of the second print job, as well as the presence of the second print job.

For example, the notification processing portion 396 displays, on the operation portion 36, a display screen regarding the print jobs stored in the storage portion 38, wherein the display screen includes an execution order, the identification information of the information processing apparatuses 10 that are the transmission sources, and name information of groups into which the information processing apparatuses 10 that are the transmission sources have been grouped.

The rank change processing portion 397 is configured to change a rank(s) of one or more second print jobs detected by the job detecting portion 395 in the execution order so that the one or more second print jobs are executed continuously with the first print job before or after thereof. For example, the rank change processing portion 397 may be configured to switch between changing and unchanging the rank(s) of the one or more second print jobs in the execution order in accordance with a user operation.

The change notifying portion 398, in a case where the rank of the second print job in the execution order has been changed by the rank change processing portion 397, notifies the second information processing apparatus that is the transmission source of the second print job, of the identification information of the first information processing apparatus that is the transmission source of the first print job.

In a case where a second print job detected by the job detecting portion 395 is a confidential print job, the permission requesting portion 399 notifies, in accordance with a user operation, the second information processing apparatus that is the transmission source of the confidential print job, of the identification information of the first information processing apparatus that is the transmission source of the first print job, and requests a permission to execute the confidential print job.

On the other hand, upon acquiring the permission to execute the confidential print job from the second information processing apparatus, the print processing portion 392 executes the confidential print job. That is, the execution condition includes that the permission requesting portion 399 has acquired the permission to execute the confidential print job.

[Notification Process]

In the following, with reference to FIG. 4, a description is given of an example of the procedure of the notification process executed by the control portion 39 in the image forming apparatus 30. Here, steps S1, S2, . . . represent numbers assigned to the processing procedures (steps) executed by the control portion 39. It is noted that the notification process is executed in a case where a print job is executed by the print processing portion 392 of the control portion 39. Here, the process of executing the print job performed by the print processing portion 392 of the control portion 39 is an example of the first step of the present invention.

<Step S1>

First, in step S1, the control portion 39 determines whether or not a presence of a human within the specific range has been detected. Here, the process of step S1 is an example of the second step of the present invention, and executed by the human detecting portion 393 of the control portion 39.

For example, in a case where a mobile terminal 20 whose terminal identification information has been stored in advance in the image forming apparatus 30 is detected within the specific range, the control portion 39 determines that a human is present within the specific range.

For example, the control portion 39 controls the communication portion 37 to transmit a control signal conforming to a Bluetooth communication system to the periphery of the image forming apparatus 30 so as to detect whether or not an apparatus that can perform the Bluetooth communication is present within the Bluetooth communication range. Subsequently, if a pairing ID acquired from a detected apparatus matches the pairing ID of the mobile terminal 20 that is stored as the terminal identification information in the storage portion 38, the control portion 39 determines that a presence of a mobile terminal 20 whose terminal identification information has been stored in advance in the image forming apparatus 30, was detected within the specific range.

Here, upon determining that a presence of a human within the specific range has been detected (Yes side at S1), the control portion 39 moves the process to step S2. In addition, upon determining that a presence of a human within the specific range has not been detected (No side at S1), the control portion 39 waits at step S1 for a presence of a human within the specific range to be detected.

<Step S2>

In step S2, the control portion 39 identifies, from the print jobs stored in the storage portion 38, a first print job that corresponds to the human detected in step S1. Here, the process of step S2 is an example of the third step of the present invention, and executed by the job identifying portion 394 of the control portion 39.

For example, the control portion 39 identifies, as the first print job, a print job that was transmitted from an information processing apparatus 10 that had been set in advance in correspondence with the mobile terminal 20 detected in step S1.

For example, control portion 39 reads, from the storage portion 38, identification information of an information processing apparatus 10 that corresponds to the pairing ID of the mobile terminal 20 detected in step S1. The control portion 39 then identifies, from the print jobs stored in the storage portion 38, a print job that was transmitted from an information processing apparatus 10 whose identification information matches the read identification information, as the first print job.

<Step S3>

In step S3, the control portion 39 detects, from the print jobs stored in the storage portion 38, a presence or an absence of a second print job that was transmitted from one or more second information processing apparatuses that have been grouped into the same group as a first information processing apparatus that is a transmission source of the first print job identified in step S2. Here, the process of step S3 is an example of the fourth step of the present invention, and executed by the job detecting portion 395 of the control portion 39.

For example, the control portion 39 reads, from the storage portion 38, identification information of an information processing apparatus 10 that has been grouped into the same group as the first information processing apparatus that is the transmission source of the first print job identified in step S2. The control portion 39 then identifies, as the second print job, from the print jobs stored in the storage portion 38, a print job that was transmitted from an information processing apparatus 10 whose identification information matches the read identification information.

<Step S4>

In step S4, the control portion 39 notifies a presence of the second print job detected in step S3, the rank of the second print job in the execution order, and identification information of a second information processing apparatus that is a transmission source of the second print job. Here, the process of step S4 is an example of the fifth step of the present invention, and executed by the notification processing portion 396 of the control portion 39.

With the above-described configuration, a user who reached the installation position of the image forming apparatus 30 to collect a print, can recognize a presence of a print job (the second print job) of a person who belongs to the same group as the user. This enables the user to wait until a completion of execution of the second print job and collect a print that is output as a result of the execution of the second print job.

In addition, the notification of the rank of the second print job in the execution order enables the user to recognize a rough waiting time until the completion of execution of the second print job. Furthermore, with the configuration where the identification information of the second information processing apparatus that is the transmission source of the second print job, is notified, the user can recognize a person who belongs to the same group and has transmitted the second print job.

For example, the control portion 39 displays, on the operation portion 36, a display screen regarding the print jobs stored in the storage portion 38, wherein the display screen includes an execution order, the identification information of the information processing apparatuses 10 that are the transmission sources, and name information of groups into which the information processing apparatuses 10 that are the transmission sources have been grouped.

Figure 4:
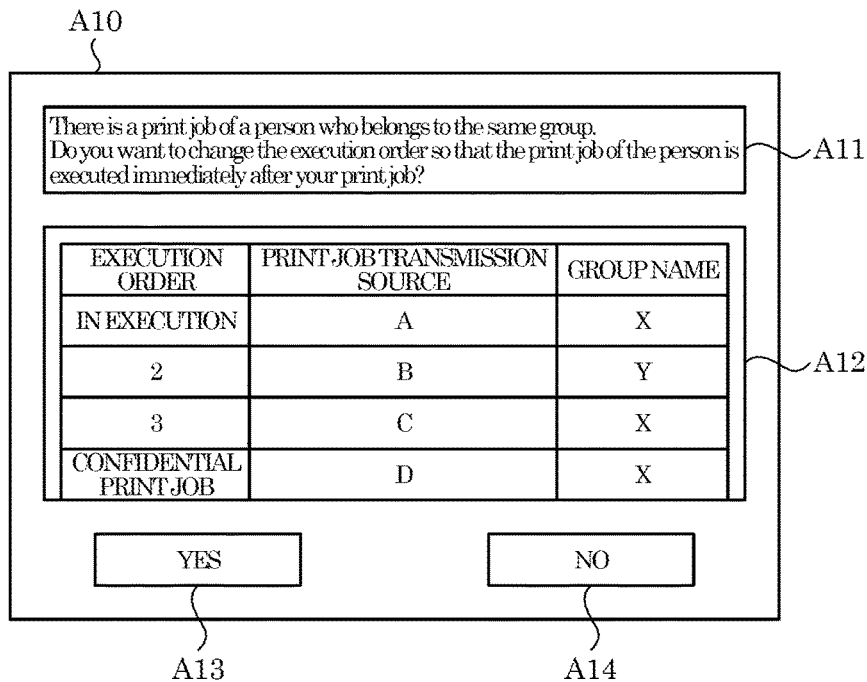
FIG. 4 is a diagram showing an example of a display screen displayed on an operation portion of the image forming apparatus according to the embodiment of the present invention.

Here, FIG. 4 shows an example of the display screen displayed on the operation portion 36 in step S4. It is noted that FIG. 4 shows an example of the display screen in a case where in step S2, a currently executed print job is identified as the first print job in a state where four print jobs including one confidential print job are stored in the storage portion 38.

A display screen A10 shown in FIG. 4 includes a message display field A11, a job list display field A12, and operation keys A13 to A14. In the message display field A11, a message to the user is displayed. In the job list display field A12, an execution order, the identification information of the information processing apparatuses 10 that are the transmission sources, and name information of groups into which the information processing apparatuses 10 that are the transmission sources have been grouped, are displayed with regard to the print jobs stored in the storage portion 38. It is noted that the user can perform a swipe operation in the job list display field A12 so as to scroll the display content of the job list display field A12 in an up-down direction.

The operation keys A13 to A14 are used to select whether or not to change the rank(s), in the execution order, of the one or more second print jobs detected in step S3 so that the one or more second print jobs are executed continuously with the first print job after thereof.

Meanwhile, in a case where the second print job has been detected during the process of step S3, the control portion 39 outputs a print that is output as a result of execution of the second print job, in such a manner as to be distinguishable from prints output as a result of executions of the other print jobs. For example, the control portion 39 discharges a print that is output as a result of execution of the second print job, to a sheet discharge tray 351 that is different from sheet discharge trays 351 to which prints output as a result of executions of the other print jobs are discharged.

With the above-described configuration, the user who collects a print output as a result of execution of the second print job as well as a print that is output as a result of execution of the first print job, can distinguish the print output as a result of execution of the second print job, from among prints output from the image forming apparatus 30.

<Step S5>

In step S5, the control portion 39 determines whether or not a user operation instructing to change the rank of the second print job in the execution order has been performed.

For example, when the operation key A13 has been operated on the display screen A10, the control portion 39 determines that a user operation instructing to change the rank of the second print job in the execution order has been performed. On the other hand, when the operation key A14 has been operated on the display screen A10, the control portion 39 determines that a user operation instructing to change the rank of the second print job in the execution order is not performed.

Here, upon determining that a user operation instructing to change the rank of the second print job in the execution order has been performed (Yes side at S5), the control portion 39 moves the process to step S6. In addition, upon determining that a user operation instructing to change the rank of the second print job in the execution order is not performed (No side at S5), the control portion 39 moves the process to step S8.

<Step S6>

In step S6, the control portion 39 changes the rank(s) of the one or more second print jobs detected in step S3 in the execution order so that the one or more second print jobs are executed continuously with the first print job after thereof. Here, the process of step S6 is executed by the rank change processing portion 397 of the control portion 39.

With the above-described configuration, with regard to a user who collects a print that is output as a result of execution of the second print job, as well as a print that is output as a result of execution of the first print job, it is possible to reduce a waiting time until a completion of execution of the second print job.

In addition, with the configuration where changing and unchanging the rank of the second print job in the execution order can be switched from each other in accordance with a user operation, it is avoided that the execution order of print jobs is changed even when the user has no intention to collect a print that is output as a result of execution of the second print job.

For example, the control portion 39, after execution of the process of step S6, displays, on the operation portion 36, a display screen indicating an execution order of the print jobs.

Figure 5:
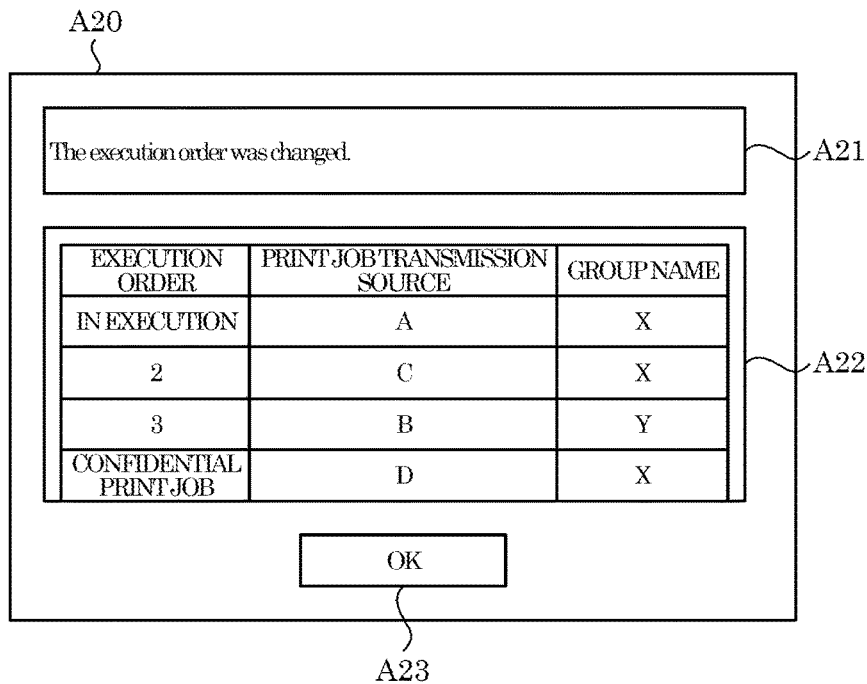
FIG. 5 is a diagram showing an example of a display screen displayed on the operation portion of the image forming apparatus according to the embodiment of the present invention.

Here, FIG. 5 shows an example of the display screen displayed on the operation portion 36 after execution of the process of step S6. A display screen A20 shown in FIG. 5 includes a message display field A21, a job list display field A22, and an operation key A23. In the message display field A21, as in the message display field A11, a message to the user is displayed. The operation key A23 is an operation key that is used to end the display of the display screen A20.

In the job list display field A22, an execution order of the print jobs after execution of the process of step S6 is displayed. Specifically, in the example shown in FIG. 4 and FIG. 5, the rank of a print job that belongs to the same group as the first print job that is in execution, is changed from the third to the second so as to be executed continuously with the first print job after thereof. The rank of a print job (the confidential print job) transmitted from a transmission source D is not changed.

<Step S7>

In step S7, the control portion 39 notifies the second information processing apparatus that is the transmission source of the second print job, of the identification information of the first information processing apparatus that is the transmission source of the first print job. Here, the process of step S7 is executed by the change notifying portion 398 of the control portion 39.

With the above-described configuration, the user of the second information processing apparatus that is the transmission source of the second print job, can recognize a presence of another person who may, instead of the user him/herself, collect a print of the user.

<Step S8>

In step S8, the control portion 39 determines whether or not a confidential print job is included in the print jobs stored in the storage portion 38.

Upon determining that the confidential print job is included in the print jobs (Yes side at S8), the control portion 39 moves the process to step S9. In addition, upon determining that the confidential print job is not included in the print jobs (No side at S8), the control portion 39 moves the process to step S10.

<Step S9>

In step S9, the control portion 39 determines whether or not a user operation has been performed to request a permission to execute the confidential print job to a second information processing apparatus that is a transmission source of the confidential print job.

For example, after execution of the process of step S8, the control portion 39 displays, on the operation portion 36, a display screen for specifying whether or not to request a permission to execute the confidential print job to the second information processing apparatus that is the transmission source of the confidential print job.

Figure 6:
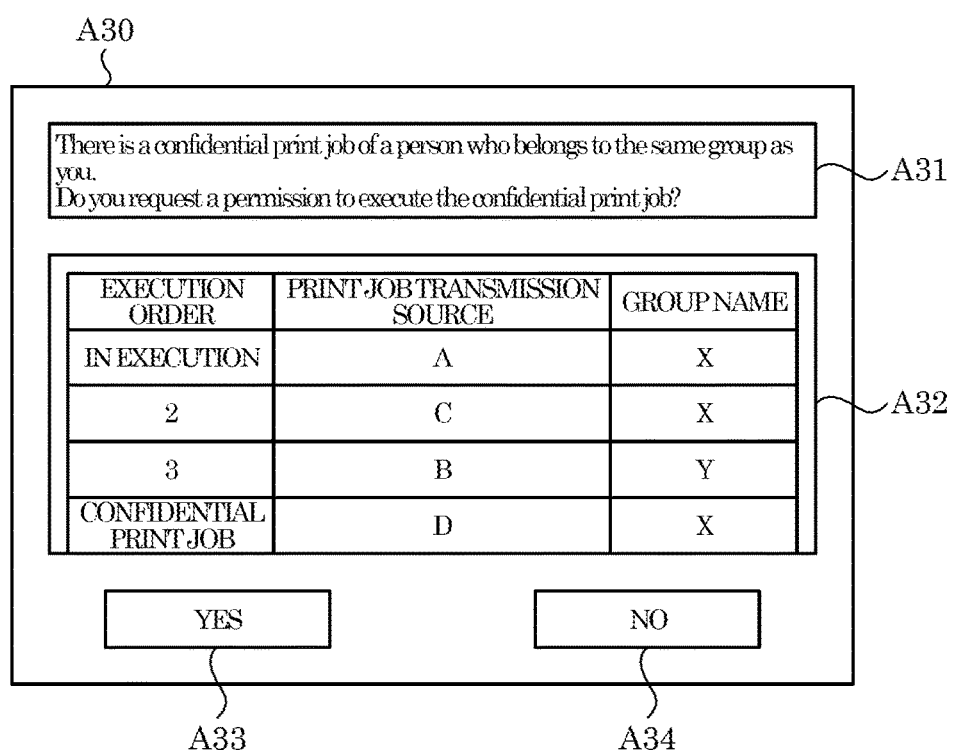
FIG. 6 is a diagram showing an example of a display screen displayed on the operation portion of the image forming apparatus according to the embodiment of the present invention.

Here, FIG. 6 shows an example of the display screen displayed on the operation portion 36 after execution of the process of step S8. A display screen A30 shown in FIG. 6 includes a message display field A31, a job list display field A32, and operation keys A33 to A34. In the message display field A21, as in the message display field A11, a message to the user is displayed. The display content of the job list display field A32 is the same as that of the job list display field A22. The operation keys A33 to A34 are used to select whether or not to request a permission to execute the confidential print job to the second information processing apparatus that is the transmission source of the confidential print job.

For example, when the operation key A33 has been operated on the display screen A30, the control portion 39 determines that a user operation has been performed to instruct to request a permission to execute the confidential print job to the second information processing apparatus that is the transmission source of the confidential print job. On the other hand, when the operation key A34 has been operated on the display screen A30, the control portion 39 determines that a user operation has been performed to instruct not to request a permission to execute the confidential print job to the second information processing apparatus that is the transmission source of the confidential print job.

Here, upon determining that a user operation has been performed to instruct to request a permission to execute the confidential print job (Yes side at S9), the control portion 39 moves the process to step S91. In addition, upon determining that a user operation has not been performed to instruct to request a permission to execute the confidential print job (No side at S9), the control portion 39 moves the process to step S10.

<Step S10>

In step S10, the control portion 39 determines whether or not an absence of the human who was detected in step S1 within the specific range has been detected. For example, in a case where a communication with the mobile terminal 20 detected in step S1 has been interrupted, the control portion 39 determines that an absence of the human who was detected in step S1 within the specific range has been detected. Here, the process of step S10 is executed by the human detecting portion 393 of the control portion 39.

Here, upon determining that an absence of the human who was detected in step S1 within the specific range has been detected (Yes side at S10), the control portion 39 moves the process to step S1. In addition, upon determining that an absence of the human who was detected in step S1 within the specific range has not been detected (No side at S10), the control portion 39 waits at step S10 for detection of an absence of the human who was detected in step S1 within the specific range.

<Step S91>

In step S91, the control portion 39 notifies the second information processing apparatus that is the transmission source of the confidential print job, of the identification information of the first information processing apparatus that is the transmission source of the first print job, and requests a permission to execute the confidential print job. Here, the process of step S91 is executed by the permission requesting portion 399 of the control portion 39.

With the above-described configuration, a user of an information processing apparatus 10 that is requested a permission to execute the confidential print job, can recognize a presence of another person who would, instead of the user him/herself, collect a print that is output as a result of execution of the confidential print job, before determining whether or not to permit the execution of the confidential print job.

Upon receiving from the image forming apparatus 30 a request for a permission to execute the confidential print job, the second information processing apparatus transmits an execution permission or an execution non-permission to the image forming apparatus 30 in accordance with a user operation.

<Step S92>

In step S92, the control portion 39 determines whether or not an absence of the human who was detected in step S1 within the specific range has been detected. Here, the process of step S92 is executed by the human detecting portion 393 of the control portion 39.

Here, upon determining that an absence of the human who was detected in step S1 within the specific range has been detected (Yes side at S92), the control portion 39 moves the process to step S1. In addition, upon determining that an absence of the human who was detected in step S1 within the specific range has not been detected (No side at S92), the control portion 39 moves the process to step S93.

<Step S93>

In step S93, the control portion 39 determines whether or not a response to the request for a permission to execute the confidential print job has been received from the second information processing apparatus.

Here, upon determining that a response has been received from the second information processing apparatus (Yes side at S93), the control portion 39 moves the process to step S94. In addition, upon determining that a response has not been received from the second information processing apparatus (No side at S93), the control portion 39 moves the process to step S92, and waits for a detection of an absence of the human who was detected in step S1 within the specific range, or a reception of a response from the second information processing apparatus.

<Step S94>

In step S94, the control portion 39 determines whether or not a response from the second information processing apparatus is a permission to execute the confidential print job.

Here, upon determining that the response from the second information processing apparatus is a permission to execute the confidential print job (Yes side at S94), the control portion 39 moves the process to step S95. In addition, upon determining that the response from the second information processing apparatus is not a permission to execute the confidential print job (No side at S94), the control portion 39 moves the process to step S10.

<Step S95>

In step S95, the control portion 39 executes the confidential print job whose execution was permitted in step S94.

As described above, in the communication system 100, when a presence of a human is detected within the predetermined specific range from the image forming apparatus 30, the first print job corresponding to the detected human is identified, a presence or an absence of the second print job is detected based on the identified first print job, and if a presence of the second print job is detected, the presence of the second print job is notified. With this configuration, a user who collects a print that is output as a result of execution of the first print job, can wait until a completion of execution of the second print job and collect a print that is output as a result of the execution of the second print job. Accordingly, this reduces labor and time of the users who collect prints.

The invention claimed is:

1. An image forming apparatus comprising:
    a print processing portion configured to execute, in an order of reception, print jobs transmitted from a plurality of information processing apparatuses;
    a human detecting portion configured to detect a presence or an absence of a human within a predetermined specific range from the image forming apparatus;
    a job identifying portion configured to, in a case where a presence of a human has been detected by the human detecting portion, identifies, from the print jobs, a first print job that corresponds to the human detected by the human detecting portion;
    a job detecting portion configured to detect, from the print jobs, a presence or an absence of a second print job that was transmitted from any of one or more second information processing apparatuses that have been grouped into the same group as a first information processing apparatus that is a transmission source of the first print job identified by the job identifying portion;
    a notification processing portion configured to, in a case where the second print job has been detected by the job detecting portion, notify the presence of the second print job, a rank of the second print job in an execution order of the print jobs, and identification information of a second information processing apparatus that is a transmission source of the second print job;
    a rank change processing portion configured to change rank(s) of one or more second print jobs detected by the job detecting portion in the execution order so that the one or more second print jobs are executed continuously with the first print job before or after thereof, wherein
    the notification processing portion displays, on an operation portion, a display screen that includes the execution order of the print jobs, identification information of the information processing apparatuses that are transmission sources of the print jobs, and name information of groups into which the information processing apparatuses that are the transmission sources have been grouped, and
    the rank change processing portion switches between changing and not changing the rank(s) of the one or more second print jobs in the execution order in accordance with a user operation performed on the display screen.

2. The image forming apparatus according to claim 1, wherein
    the job identifying portion identifies, as the first print job, a print job that is being executed by the print processing portion.

3. The image forming apparatus according to claim 1, wherein
    in a case where a mobile terminal whose terminal identification information has been stored in advance in the image forming apparatus is detected within the specific range, the human detecting portion determines that a human is present within the specific range, and
    the job identifying portion identifies, as the first print job, a print job that was transmitted from an information processing apparatus that had been set in advance in correspondence with the mobile terminal detected by the human detecting portion.

4. The image forming apparatus according to claim 1, wherein
    the job identifying portion includes:
        an information acquiring portion configured to acquire user information, and
    the job identifying portion identifies, as the first print job, a print job that was transmitted from an information processing apparatus that had been set in advance in correspondence with the user information acquired by the information acquiring portion.

5. The image forming apparatus according to claim 1, further comprising:
    a change notifying portion configured to, in a case where the rank of the second print job in the execution order has been changed by the rank change processing portion, notifies the second information processing apparatus that is a transmission source of the second print job, of identification information of the first information processing apparatus that is the transmission source of the first print job.

6. The image forming apparatus according to claim 1, further comprising:
a permission requesting portion configured to, in a case where a second print job detected by the job detecting portion is a confidential print job, notify, in accordance with a user operation, a second information processing apparatus that is a transmission source of the confidential print job, of the identification information of the first information processing apparatus that is the transmission source of the first print job, and requests a permission to execute the confidential print job, and
in a case where a print job transmitted from an information processing apparatus is a confidential print job, the print processing portion suspends execution of the confidential print job until an execution condition is satisfied, the execution condition being an input of predetermined job authentication information or being that the permission requesting portion has acquired the permission to execute the confidential print job.

7. The image forming apparatus according to claim 1, wherein
the print processing portion outputs a print that is output as a result of execution of the second print job, in such a manner as to be distinguishable from prints output as a result of executions of the other print jobs.

8. An image forming method comprising:
a first step of executing, in an order of reception, print jobs transmitted from a plurality of information processing apparatuses;
a second step of detecting a presence or an absence of a human within a predetermined specific range from an image forming apparatus;
a third step of, in a case where a presence of a human has been detected in the second step, identifies, from the print jobs, a first print job that corresponds to the human detected in the second step;
a fourth step of detecting, from the print jobs, a presence or an absence of a second print job that was transmitted from any of one or more second information processing apparatuses that have been grouped into the same group as a first information processing apparatus that is a transmission source of the first print job identified in the third step;
a fifth step of, in a case where the second print job has been detected in the fourth step, notifying the presence of the second print job, a rank of the second print job in an execution order of the print jobs, and identification information of a second information processing apparatus that is a transmission source of the second print job; and
a sixth step of changing rank(s) of one or more second print jobs detected in the fourth step in the execution order so that the one or more second print jobs are executed continuously with the first print job before or after thereof, wherein
in the fifth step, a display screen is displayed on an operation portion, the display screen including the execution order of the print jobs, identification information of the information processing apparatuses that are transmission sources of the print jobs, and name information of groups into which the information processing apparatuses that are the transmission sources have been grouped, and
in the sixth step, changing and not changing the rank(s) of the one or more second print jobs in the execution order are switched in accordance with a user operation performed on the display screen.

* * * * *